Oct. 15, 1929.                    C. Q. PAYNE                    1,731,790
                  METHOD OF PRODUCING ANTIFRICTION BUSHINGS
                            Filed Feb. 16, 1927

INVENTOR
Clarence Q. Payne,
BY
ATTORNEYS

Patented Oct. 15, 1929

1,731,790

UNITED STATES PATENT OFFICE

CLARENCE Q. PAYNE, OF NEW YORK, N. Y.

METHOD OF PRODUCING ANTIFRICTION BUSHINGS

Application filed February 16, 1927. Serial No. 168,612.

This invention relates to improvements in antifriction bushings of bearings which support rotating, oscillating or reciprocating members, and it comprises improved means for efficiently embodying the invention described in Letters Patent No. 1,600,961 granted to me for means for reducing the sliding friction of contact members.

In accordance with the above invention, by making both of two contact surfaces of a bearing of much harder metal than has heretofore been considered feasible and by giving at least one of them a plastic or resilient support, a very low coefficient of sliding friction is obtained. While both of the surfaces should be of substantially the same order of hardness, as for example chromium and case hardened steel, the hardness of the latter being slightly variable, may be made somewhat less than that of the former for economy of replacement. My present invention is concerned with the member having a chromium contact surface, and with a means and method for making it efficiently and economically available for antifriction bushings.

The invention consists essentially in using a wrought or rolled metal bushing, one of whose surfaces is polished and electroplated, while flat, with a layer of hard metal whose thickness and surface is controlled by conditions of the electrolytic deposition, and which is finally shaped by pressure to a cylindrical or other form desired.

In the accompanying drawings which show a preferred method of practicing the invention, Figure 1 illustrates the shaping of the flat steel metal plate into cylindrical form by bending it with the plated surface on the inner or concave side.

It has been the general practice heretofore to make the bushing of a bearing which supports the shaft of power transmitting machinery of a much softer metal, such as babbitt or bronze, etc., than that of its journal or shaft which is usually made of steel. The object is to cause the wear of the sliding surfaces to be taken by the bushing and thus protect the more expensive shaft from wear, in order to reduce the cost of repairs and renewals. This practice of making the contact metals of a bearing of a wide difference in hardness, such as steel and bronze, etc., does not, however, secure a low coefficient of sliding friction, especially where the surfaces move at high speeds and under relatively heavy pressures. My invention set forth in Patent No. 1,600,691 departs radically from this general practice. It employs metals of a high order of hardness such as chromium, which is one of the hardest known metals, for at least one of the contact surfaces. This is given a resilient or plastic support in order to distribute the pressure uniformly over the supporting surfaces, and in this way a very low coefficient of sliding friction of the contact surfaces is obtained. In a certain case my present invention reverses the usual practice by making the bushing the more durable of the two contact members.

Figure 2:
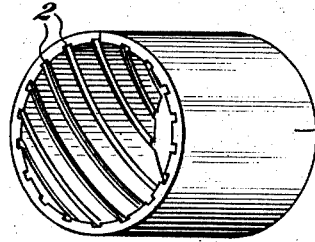
Figure 2 shows a perspective view of the bushing of Figure 1.
Figure 5:
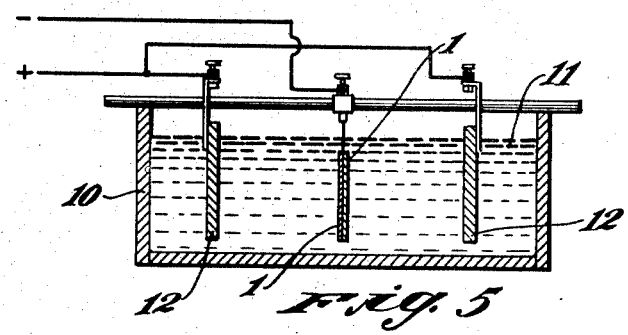
Figure 5 illustrates in outline or diagrammatically, the electrolytic deposition of the chromium plating on a flat sheet metal plate or anode.

In constructing the bushing of a bearing to carry out my invention I preferably employ a thin sheet of rolled metal 1 in order to obtain a certain degree of flexibility or resilience in shaping it to its final form, as well as for subsequent adjustment to pressure. This metal may be either soft iron, brass, copper, aluminum, etc., but is preferably of bronze. It is cut to the dimensions required by the length and diameter of its bearing, and flattened. Shallow grooves 2 are then formed on one surface for graphite or oil lubrication so that the pressure supporting areas shall frequenty alternate with areas which provide means for lubrication. These grooves may be placed either parallel with the axis of the bearing, or at an angle to it as shown in Figure 2. The grooved surface of the bushing blank is buffed or burnished in order to secure a polished or "mirror" surface, and this surface is then coated with a uniform thickness of a very hard metal like chromium by immersing it in a tank 10 with a suitable electrolizing solution 11 as indicated in Figure 5.

It is important that the plated surface receive a high polish before it is plated for two reasons—one is that any film of oxide, always more or less present on metal which has been subjected to heat and pressure, is thereby removed. This secures for the chromium plating a more intimate contact and firmer bond with the metal backing than is the case with a tarnished surface. The other reason is that chromium plating having a polished or "mirror" surface gives a lower coefficient of sliding friction than one having a dull or roughened surface. This "mirror" surface of chromium becomes an exact reproduction of the polished surface of its backing metal when the conditions of the electrolytic bath, as regards temperature, current density and acidity are properly adjusted in order to secure this type of surface in place of a "satin" finish, or one having a still rougher surface.

Any subsequent machining or polishing is thus avoided, which would be difficult and expensive with so hard a metal as chromium. This mirror surface is therefore on essential element of my present invention.

As illustrated the chromium anodes 12 are immersed in the electrolyte 11 and the sheets 1 comprising the cathodes plated in the conventional manner.

An important advantage in plating a flat metal sheet with chromium is that a more uniform thickness of metal can thus be obtained. Chromium does not "throw" well in electroplating, i. e., it does not cover hollows or deep recesses with a uniform thickness of metal. If cast metal bushings are therefore split and plated with chromium the thickness of the plating will vary somewhat around the inner circumference of the bearing surface. Such bushings give an imperfect bearing support. In carrying out the plating operation two of the grooved and polished sheet metal blanks may conveniently be placed back to back in the electrolyte tank as indicated at 1—1 in Figure 5 in order to plate only one surface each of the two blanks. They thus form the cathodes while the anodes 12—12 placed respectively opposite them are made of such surface areas with respect to the areas of the cathode blanks as to insure a uniform thickness of chromium plating along the entire exposed areas. In this way a better control of the chromium plating is obtained and any slight variation brought within the fit or tolerances required of accurate machine work. This is attained without any subsequent machining or grinding whatever. The actual thickness of the chromium plating may vary with the nature of the service for which the bushing is designed,—but usually it will not exceed .001" to .002".

Figure 1:
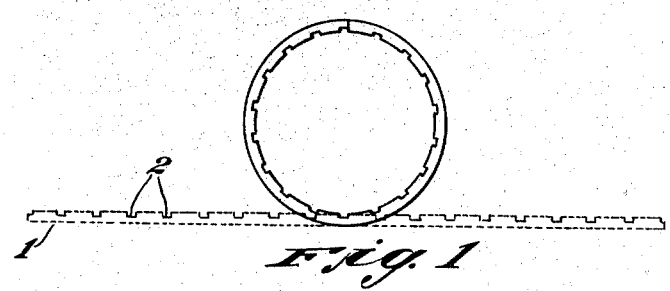
Figure 3:
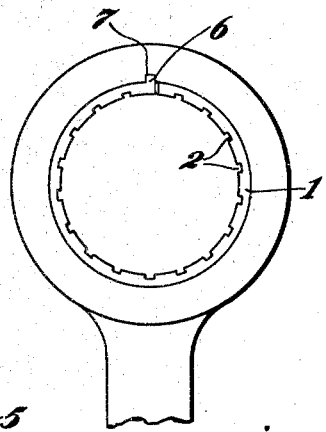
Figures 3 and 4 illustrate means for keeping the bushing from rotating in its support by means of a key or a flanged edge of the sheet metal bushing.
Figure 4:
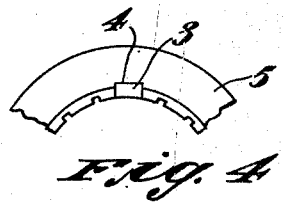

The final operation consists in shaping the flat chromium plated blank 1 by pressure to enable it to assume a cylindrical form as indicated in Figures 1 and 2, with the chromium plating on the inner or concave side. This shaping may be done by mechanical means as by rolling or by a hydraulic punch and die as may be found most convenient. Not only is the flexibility of the bushing increased by the grooving of its inner surface but the edges of the grooves being thus made to approach slightly, they hold firmly any solid lubricant, like graphite, inserted in them. When utilized for a shaft bushing and placed in its bearing support the bushing may be held from rotating by tinning the inner bearing surface and then sweating in the bushing with hot solder, or a key 3 fitting between the edges of the bushing and into a key way 4 in the bearing 5 may be employed in place of solder as shown in Figure 4,—or one end 6 of the bushing may be slightly flanged—as shown in Figure 3. In the latter case a narrow slot 7 is cut in the bearing,— and the flange is then inserted in it when the bushing is forced into its bearing seat. If desired the sheets 1 may be of large size and after plating may be cut into smaller pieces for forming a plurality of bearings with the one plating operation.

An antifriction bushing made in accordance with my present invention secures many important advantages. A chromium plated surface having a high polish may thus be made to conform to the accuracy of a machine fit without any machine work extended upon it. The coefficient of sliding friction, by reason of the hardness and smoothness of the contact surface is also greatly reduced, especially when employed in cooperation with a pressure bearing surface having substantially the same order of hardness as described in my Patent No. 1,600,961. The sheet metal backing employed is sufficiently soft metal to enable it to be shaped by pressure, and having a series of lubricating grooves formed in it preferably by roll pressure while flat,—the chromium plated areas are thus given a plastic or resilient support for its cooperating pressure member. In this way a highly efficient antifriction bushing can be made with practically no machine work. Its weight so constructed will not exceed about one quarter that of the usual cast or drawn bronze bushing for shaft bearings.

While I have referred to my invention in connection with a bushing for shaft bearings, it will be readily understood that it can likewise be utilized with equal advantage for linings having reciprocating pressure members as well, such as steam engines, air compressors, refrigerating machines, and automobile engines, etc. In such cases the lubricating grooves may preferably be filled with a soft metal like babbitt, solder, etc. in place of graphite to insure a tight fit under severe service and to prevent possible leakage of gas between the piston rings and the cylinder wall lining.

It will be understood that the invention is not limited to the details chosen to illustrate the same, but that various modifications and changes may be made therein without departing from the spirit of the invention or the scope of the appended claims.

Having thus described my invention I claim:

1. The method of producing an antifriction bearing, which comprises providing a flat sheet of relatively plastic wrought metal of a low degree of hardness, electroplating the same while in a flat condition with an antifriction material of a high degree of hardness and bending the plated sheet into a bearing with the plated surface exposed to wear and the material of a low degree of hardness forming a cushioning back for the wearing surface.

2. The method of producing an antifriction bearing, which comprises providing a flat sheet of relatively plastic wrought metal, electroplating the same while in a flat condition with chromium and bending the plated sheet into a bearing with the chromium surface exposed to the moving parts and the relatively plastic material forming a cushioning back for the wearing surface.

3. The method of producing an antifriction bushing, which comprises providing a flat sheet of relatively plastic wrought metal, depositing a smooth layer of chromium thereon while in a flat condition and shaping said sheet into a bushing with the chromium surface exposed to the moving parts and the relatively plastic material forming a cushioning back for the wearing surface.

In testimony whereof I have affixed my signature to this specification.

CLARENCE Q. PAYNE.